July 17, 1934.   J. WALKER ET AL   1,966,839

FIFTH WHEEL CONNECTION

Filed April 18, 1933

INVENTORS:
John Walker and
Ferdinand Miller,
BY
Redding, Greeley, O'Shea & Campbell
THEIR ATTORNEYS Patented July 17, 1934

1,966,839

UNITED STATES PATENT OFFICE 1,966,839

FIFTH WHEEL CONNECTION

John Walker, Westfield, and Ferdinand Miller, Elizabeth, N. J., assignors to International Motor Company, New York, N. Y., a corporation of Delaware Application April 18, 1933, Serial No. 666,644

6 Claims. (Cl. 280—33.1)

The present invention relates to fifth wheel connections for motor vehicles and embodies, more specifically, an improved form of fifth wheel connection by means of which tractor and trailer elements may be conveniently and effectively connected.

Numerous fifth wheel connections for motor vehicles have been designed and are now available, these structures including a bearing member preferably carried upon the tractor and provided with guiding jaws whereby a king pin which is carried upon the trailer may be guided into a latching recess, the movement of such pin into the recess automatically operating a latch member to maintain the elements locked in a connected position. Manual means is provided for releasing the latch member in order that the elements may be separated when desired. With the foregoing as a back ground, the present invention has been designed to afford a latching and releasing mechanism of an improved design which may be readily manufactured and assembled and which, in operation is positive in both latching and releasing operations.

A further object of the invention is to provide a fifth wheel connection by means of which a latch member may be effectively and securely maintained in latching position, the mechanism for so maintaining the same being utilized to maintain the mechanism in such released position that, upon coupling movement, the latch member is yieldingly released to move into a locked position.

A further object of the invention is to provide a locking and releasing mechanism for fifth wheel connections, such mechanism being positively actuated in both locking and releasing directions.

Further objects, not specifically enumerated above, will be apparent as the invention is described in greater detail in connection with the accompanying drawing, wherein.

Figure 1:
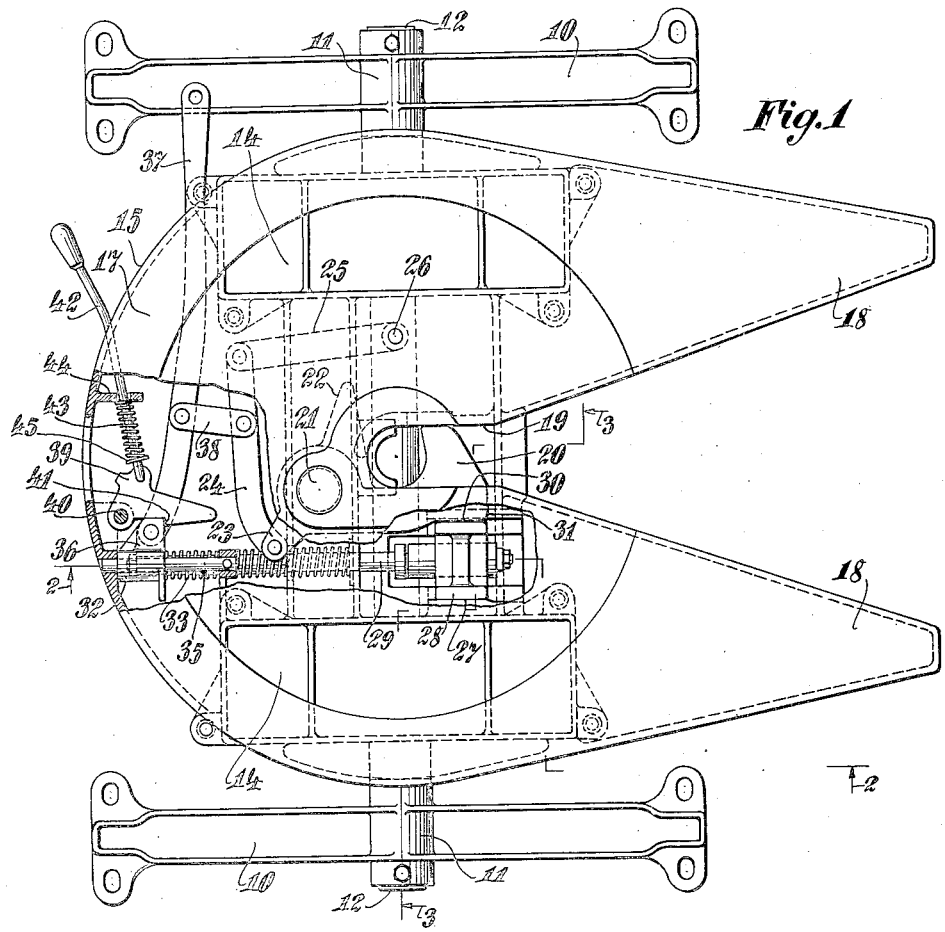
Figure 1 is a plan view, partly broken away and in section showing a fifth wheel mechanism constructed in accordance with the present invention.

With reference to the above drawing, a fifth wheel mechanism is illustrated as being mounted upon brackets 10 which are suitably secured to the frame of either the tractor or the trailer. Obviously, the operation of the mechanism is the same regardless of whether the tractor or the trailer elements carry the mechanism to be described. Brackets 10 are provided with bearings 11 within which a cross shaft 12 is journaled. Upon the cross shaft 12, longitudinally extending arms 13 are secured, the arms being suitably recessed in order that seats may be formed having extended bearing areas upon which blocks of yielding non-metallic material may be placed. These arms are adapted to be received within housings 14 formed upon one of the fifth wheel members 15. The housings 14 may be provided with covers 16 to facilitate the assembly of the structure and the fifth wheel member 15 may be provided with an annular bearing surface 17 upon which the cooperating fifth wheel member is adapted to be supported with provision for turning motion about the axes of the members.

Jaws 18 are formed upon the member 15 in order that a king pin may be guided into a latching recess 19. The king pin is adapted to be latched within the recess 19 by means of a latch member 20 which is pivoted at 21 within the member 15.

The latch member 20 is formed with a shoulder 22 which, when the latch is in a released position, projects into the recess 19 and into the path of a king pin when the latter moves into the recess from the guide jaws 18.

The latch member 20 is also formed with an arm 23 to which a link 25 is pivotally connected. Link 24 is also pivotally connected to a link 25 which is pivoted at 26 to the member 15. The foregoing linkage serves as a means by which the latch member 20 may be positively moved into a releasing position.

Within the member 15, is a guide way 27 within which a block 28 is adapted to slide. The block 28 is mounted upon a shaft 29 which is slidably mounted within the member 15, the axial movement of shaft 29 thus serving to move the block 28 longitudinally of the member 15. In the position shown in Figure 1, the block is so positioned with respect to the latch member 20 that it engages a shoulder 30 formed on the latch member, and thus holds the latch member in a locked or latching position. Movement of the shaft 29 and block 28 to the right, as viewed in Figure 1, frees the shoulder 30 and permits pivotal motion of the latch member 20 in a clockwise disection, as viewed in Figure 1, to effect the releasing of the latch mechanism. Upon movement of the latch member 20 into a released position, the block 28 is urged against a shoulder 31, formed adjacent the shoulder 30 and thus serves to hold the latch member 20 yieldingly in a released position.

Figure 2:
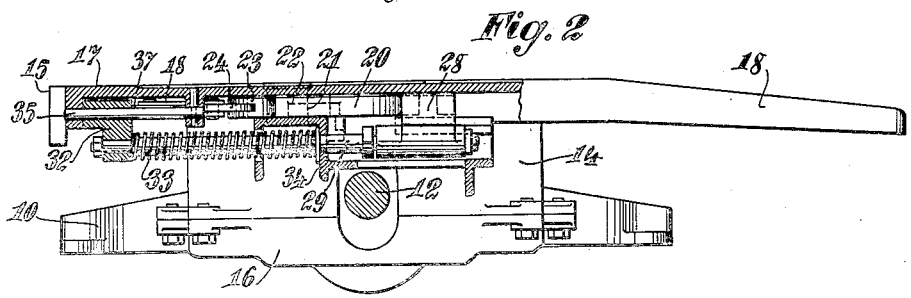
Figure 2 is a view in section, taken on the broken line 2—2 of Figure 1, and looking in the direction of the arrows.
Figure 3:
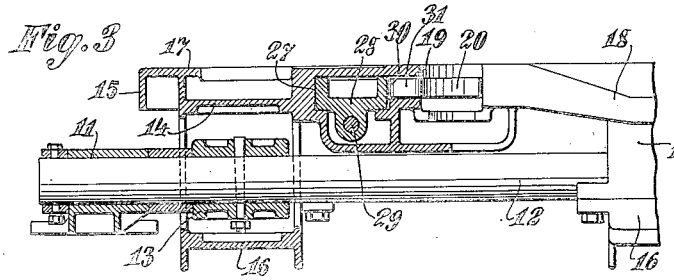
Figure 3 is a view in section, taken on the broken line 3—3 of Figure 1, and looking in the direction of the arrows.

Movement of the block 28 is effected in the following manner. Shaft 29 is slidably mounted within the fifth wheel member 15 and has secured thereto a cross head 32 against which a spring 33 engages. The other end of the spring bears against a wall 34 of the member 15 and thus urges the cross head 32 and the block 28 to the left, as viewed in Figures 1 and 2. This structure therefore causes the block to be continuously urged into a locking position.

Cross head 32 is slidably mounted upon a guide rod 35 and is provided with a flange 36 thus forming a block assembly to which a manually operated lever 37 is pivoted. A link 38 connects lever 37 with link 24 and thus establishes a positive interlock between the means for actuating the block 28 and the actuating means for the latch member 20.

In order that the block 28 and cross head 32 may be secured in a latching position, a latch member 39 is pivoted at 40 to the member 15 and is provided with a shoulder 41 which is adapted to engage a shoulder of the flange 36. An operating lever 42 is pivoted to the member 39 and is provided with a spring 43 which seats against a flange 44, formed upon the member 15, and engages a flange 45 which is secured to the member 42. Spring 43 thus urges the latch member 39 into engaging position and holds the elements in such position until the lever 42 is pulled to release the same. The operation of latch 39 by the handle 42 will be seen to include the action of a toggle, the fixed pivots of which are at 40 and 44. The spring 43 holds the latch member in either a latching or released position and when handle 42 is moved to the right as viewed in Figure 1, the toggle is broken and the latch urged into a released position. This initial action leaves the hand free to operate lever 37 and thus only one hand is required to complete the entire operation of the mechanism. The functioning of the mechanism in the opposite direction involves the movement of lever 37 to the left as viewed in Figure 1 until it strikes lever 42 and again breaks the toggle to urge the latch member 39 into a latching position. In this manner, the latch is automatically reset by virtue of the engagement of the levers 37 and 42 which lie in the same plane and the use of the latch is thus assured.

The operation of the mechanism is as follows. Assuming the elements to be in the position shown in Figure 1, to release the latch member 20, lever 42 is first actuated to release the latch 39 and lever 37 is subsequently moved in a counterclockwise direction, as viewed in Figure 1. Initial movement of lever 37 takes place about the connection of link 38 thereto as a fulcrum and thus moves shaft 29 to the right, as viewed in the drawing. This motion causes the block 28 to be moved beyond the shoulders 30 and 31 of the latch member 20 and the latter is thus released. Further movement of lever 37 then takes place about the pivot connection thereof with the flange 36 as a fulcrum and links 38 and 24 are thus moved bodily to the left as viewed in Figure 1. Such motion is accompanied by a clockwise rotation of the latch member 20 about this pivot 21 and the shoulder 31 moves in back of the block 28. After the latch member 20 has been moved as far as it will go in a clockwise direction, the spring 33 will urge the block 28 against the shoulder 31 and yieldingly maintain the elements in such position. The tripping or latching shoulder 22 thus lies within the recess 19 and is ready to be engaged by the king pin of a vehicle to be connected to the fifth wheel element. During the motion of such vehicle in a connecting operation the king pin engages the shoulder 22 and moves the latch member 20 in a counterclockwise direction. As soon as the shoulder 31 is freed from the block 28 the latter moves into the position shown in Figure 1 and the latch member 30 is locked in a coupled position.

While the invention has been described with specific reference to the accompanying drawing, it is not to be limited, save as defined in the appended claims.

We claim as our invention:

1. A fifth wheel member having a recess for receiving a king pin, a latch member pivoted adjacent the recess, a block adapted to hold the latch member in latched position, means to urge the block into latching position, and common means to move the block and latch member to an unlatched position.

2. A fifth wheel member having a recess for receiving a king pin, a latch member pivoted adjacent the recess, a block adapted to hold the latch member in latched position, manually releasable means to lock the block in latched position, and means to urge the block into latching position, and common means to move the block and latch member to an unlatched position.

3. A fifth wheel member having a recess for receiving a king pin, a latch member pivoted adjacent the recess, a block assembly adapted to hold the latch member in latched position, a manually operated lever pivoted to the block assembly, and linkage independent of the pivot connection between the lever and block connecting the lever with the latch member.

4. A fifth wheel member having a recess for receiving a king pin, a latch member pivoted adjacent the recess, a block assembly adapted to hold the latch member in latched position, a manually operated lever pivoted to the block assembly, means to urge the block into latching position, a link pivoted to the latch member, and a link connecting the manually operated lever to the last named link.

5. A fifth wheel member having a recess for receiving a king pin, a latch member pivoted adjacent the recess, a block adapted to hold the latch member in latched position, a shaft slidably mounted in the fifth wheel member and to which the block is secured, a spring on the shaft to urge the block into a latching position, a cross head on the shaft, a manually operated lever pivoted at one end on the cross head, a link pivoted on the latch member, and a link pivoted at its ends to the last named link and the manually operated lever intermediate the ends thereof.

6. A fifth wheel member having a recess for receiving a king pin, a latch member pivoted adjacent the recess, a block adapted to hold the latch member in latched position, a shaft slidably mounted in the fifth wheel member and to which the block is secured, a spring on the shaft to urge the block into a latching position, a cross head on the shaft, a manually operated lever pivoted at one end on the cross head, a floating link pivoted on the latch member, and a link pivoted at its ends to the last named link and the manually operated lever intermediate the ends thereof.

JOHN WALKER.
FERDINAND MILLER.